Patented Apr. 3, 1951

2,547,906

UNITED STATES PATENT OFFICE 2,547,906

PROCESS FOR PREPARING ALKANE SULFONIC ACIDS

John K. Fincke, Dayton, Ohio, assignor to Monsanto Chemical Company, St. Louis, Mo., a corporation of Delaware No Drawing. Application February 24, 1948, Serial No. 10,588

5 Claims. (Cl. 260—513)

This invention provides a process for preparing alkane sulfonic acids.

An object of the present invention is the provision of a process for producing alkane sulfonic acids by the nitric acid oxidation of $\beta$-(alkyl mercapto) ethanols.

It is recognized in this art that the general methods available for preparing aliphatic sulfonic acids are few in number and in general unsatisfactory (JACS 55, 1090 (1933)). The most successful method thus far described appears to be that described by McBain and Williams (JACS 55, 2250 (1933)). This method involved the preparation of the lead mercaptide by the action of hot alcoholic lead acetate upon the alkyl mercaptan, the oxidation of the lead mercaptide by means of 50% nitric acid, followed by the conversion of the lead alkyl sulfonate to alkyl sulfonates by refluxing in isopropyl alcohol to which dry hydrogen chloride is added. More recently it has been proposed to prepare alkane sulfonic acids by the direct oxidation of the mercaptan to the sulfonic acid by means of nitric acid. This method, however, in general yields a product which is somewhat colored and of a low degree of purity.

It has also recently been proposed to oxidize dialkyl sulfides by means of nitrogen oxides. This method, however, is not applicable to $\beta$-(alkyl mercapto) ethanols having more than 8 carbon atoms in the alkyl group.

I have now discovered that $\beta$-(alkyl mercapto) ethanols may be directly oxidized to the alkyl sulfonic acid by treatment with concentrated nitric acid and a pure form of the alkane sulfonic acid obtained. For the present process the alkyl group should contain at least 8 carbon atoms and may contain up to and including 18 carbon atoms. The process is best carried out by employing an excess of nitric acid over that shown by the reaction as written below. A suitable temperature is that temperature at which evolution of brown fumes of nitrogen peroxide is observed. Exploratory tests have shown that the reaction may be conducted at any temperature up to 100° C. In general the best temperatures range from 40° C. to 80° C.

The reaction apparently follows the course indicated by the equation:

$$RSC_2H_4OH + 6HNO_3 \rightarrow RSO_3H + 6NO_2 + 2CO_2$$

where R is alkyl and preferably has from 8 to 18 carbon atoms. The product produced by the present process is of a high degree of purity, that is the purity approximates 100%.

The $\beta$-(alkyl mercapto) ethanols may be prepared by the addition of one mole of ethylene oxide to the alkyl mercaptan. The mercaptan employed may be either a primary or a secondary mercaptan.

The following examples illustrate, but do not limit, the invention herein described and claimed:

Example 1

Forty grams of $\beta$-(n-octyl mercapto) ethanol was added dropwise to 170 cc. of concentrated nitric acid contained in a 500 cc. flask. After the addition was complete, the flask contents were warmed to 80° for approximately one-half hour. The excess nitric acid was removed under a vacuum. When almost all of the free nitric acid had been removed, a very vigorous reaction took place, oxides of nitrogen being given off and the mass becoming quite hot. After completion of the reaction the reaction mass was dissolved in ethyl alcohol, neutralized with caustic soda and filtered hot. The alcohol insoluble material was discarded. The alcoholic solution was then boiled down, crystallized and 23.5 grams of crystals obtained.

A small portion of the product was acidified with HCl. The NaCl formed was removed and neutralized with phenyl hydrazine in alcohol and precipitated from cold ether. The product was recrystallized from ether and melted at 87–89° C. In agreement with that found by Latimer and Bost, JACS 59, 2500 (1937) the product is n-octane sulfonic acid.

Example 2

Fifty-five grams of $\beta$-(n-dodecyl mercapto) ethanol was added dropwise to 190 cc. of concentrated (1.42 S. G.) $HNO_3$ with stirring, the temperature being kept below 45° C. Vigorous evolution of oxides of nitrogen took place, which continued for approximately three hours. At the end of this time the flask was warmed to 50° C. to 60° C. on a water bath, the solution becoming clear and wine-red in color. The flask contents were then poured into a 2-liter beaker and diluted to approximately 1500 cc. with water. The product was neutralized to a pH of 8 with 40% caustic soda and then cooled in an ice bath. Very fine crystals appeared, which were removed by filtration. The product softens at 195° C. and melts above 235° C. The product is 1-dodecane sulfonic acid. This was confirmed by preparing the benzyl aniline salt which melts at 89.5–90.5° C. According to Noller et al., JACS 55, 1090 (1933), the benzyl aniline salt of 1-dodecane sulfonic acid melts at 90–90.2° C.

*Example 3*

280 cc. of concentrated nitric acid was charged to a 1-liter, 3-necked flask fitted with mechanical stirring, dropping funnel, thermometer and a reflux condenser. The acid was warmed to 80° C. and then 53.0 grams of n-dodecyl mercapto ethanol was added slowly dropwise. The temperature was maintained at 80° C. by the heat of the reaction. The reaction product foamed quite vigorously toward the end of the addition. The flask and contents were maintained at 80° C. until all evolution of the oxides of nitrogen had ceased. The contents were then allowed to stand overnight, then warmed to 60° C. in the morning and diluted with 500 cc. of distilled water. The product was neutralized with 40% caustic soda, allowed to stand overnight, then cooled in an ice bath and crystals filtered off. The crystals were washed with ice water and were dried. Yield, 63.2 grams of dodecane sodium sulfonate corresponding to 62.0% yield.

*Example 4*

One gram mole of β-(n-octadecyl mercapto) ethanol is treated with 7 gram moles of $HNO_3$ as 1.30 specific gravity nitric acid with stirring, the temperature being maintained during the addition below 50° C. After all of the nitric acid has been added the reaction mass is refluxed for two hours. Ethyl alcohol is then added to dissolve the sulfonic acid and the sulfonic acid neutralized with caustic soda. The neutralized solution is filtered. The alcoholic neutral solution is then boiled down in order to crystallize the product which is recovered as pure, white crystals of octadecane sodium sulfonate. The sulfonic acid is obtained by acidification of the alcoholic solution with HCl, filtration of the solution to remove NaCl and evaporation of the alcohol to crystallize the sulfonic acid.

*Example 5*

100 grams of β-(n-decyl mercapto) ethanol was placed in a 2-liter, 3-necked flask, 250 cc. of distilled water was added, followed by 140 cc. of concentrated (1.42 S. G.) $HNO_3$ added and the flask stirred for two hours. Considerable heat of reaction was evolved. After the flask had cooled down somewhat it was warmed by the application of heat to a temperature of 90° C. to 100° C. One gram of ammonium vanadate was then added and refluxing was continued for an additional hour. The product was recovered by solution in alcohol, neutralization and crystallization of the sodium salt of decane sulfonic acid. The free sulfonic acid was obtained by acidification with alcohol, followed by filtration and crystallization.

*Example 6*

105 grams of β-(n-dodecyl mercapto) ethanol was added dropwise to 170 cc. of concentrated (specific gravity 1.4) $HNO_3$ in a 4-liter beaker. The temperature was maintained at 50° C. to 60° C. during addition. After about six hours the material was very viscous and almost completely water-soluble. An additional 180 cc. of nitric acid was added to insure completion of the reaction.

500 cc. of water was added, the product neutralized with 40% sodium hydroxide and the crystals filtered off and dried. 81.5 grams were obtained corresponding to a 70% yield of dodecane sulfonic acid.

It is possible to obtain the desired reaction by the employment of a more dilute nitric acid than the 1.42 S. G. $HNO_3$ employed in some of the examples. However, when this is done the time of reaction is somewhat increased, and it will be desirable in this case to increase the temperature by the application of external heat to the reaction container.

The alkane sulfonic acids produced by the present process may be used as surface-active agents, particularly for detergents, wetting agents and surface-tension modifiers.

What I claim is:

1. The process for producing alkane sulfonic acids which comprises treating β-(alkyl mercapto) ethanol with nitric acid at a temperature at which nitrogen peroxide is evolved and the —$C_2H_4OH$ group present therein is oxidized and recovering alkane sulfonic acids from the reaction product.

2. The process for producing alkane sulfonic acids which comprises treating β-(alkyl mercapto) ethanol with at least 6 moles of nitric acid at a temperature at which nitrogen peroxide is evolved and the —$C_2H_4OH$ group present therein is oxidized and thereupon recovering alkane sulfonic acids from the reaction product.

3. The process for producing alkane sulfonic acids which comprises treating β-(alkyl mercapto) ethanol, wherein the alkyl group contains from 8 to 18 carbon atoms with at least 6 moles of $HNO_3$ per mole of β-(alkyl mercapto) ethanols, at a temperature at which nitrogen peroxide is evolved and the —$C_2H_4OH$ group present therein is oxidized and thereupon recovering alkane sulfonic acid from the reaction product.

4. The process for producing alkane sulfonic acids which comprises treating β-(alkyl mercapto) ethanol, wherein the alkyl group contains from 8 to 18 carbon atoms with at least 6 moles of $HNO_3$ per mole of β-(alkyl mercapto) ethanol at a temperature below 100° C., whereby the —$C_2H_4OH$ group present therein is oxidized.

5. The process for producing alkane sulfonic acids which comprises treating β-(alkyl mercapto) ethanol, wherein the alkyl group contains from 8 to 18 carbon atoms with at least 6 moles of $HNO_3$ per mole of β-(alkyl mercapto) ethanol at a temperature between 40° C. and 80° C., whereby the —$C_2H_4OH$ group present therein is oxidized.

JOHN K. FINCKE.

REFERENCES CITED

The following references are of record in the file of this patent:

UNITED STATES PATENTS

| Number | Name | Date |
|---|---|---|
| 1,925,191 | Keller | Sept. 5, 1933 |
| 1,966,187 | Schirm | July 10, 1934 |
| 2,204,210 | Farlow | June 11, 1940 |
| 2,338,830 | Werntz | Jan. 11, 1944 |
| 2,346,102 | De Simo | Apr. 4, 1944 |
| 2,374,983 | De Simo | May 1, 1945 |

OTHER REFERENCES

Deutsche Chemische Gesellschaft (Berichte) vol. 8, part 1, page 533 (1875).